No. 645,427. Patented Mar. 13, 1900.
E. POLANOWSKI.
MACHINE FOR MILLING CONE SCREW WHEELS.
(Application filed Dec. 21, 1897.)
(No Model.) 2 Sheets—Sheet 1.
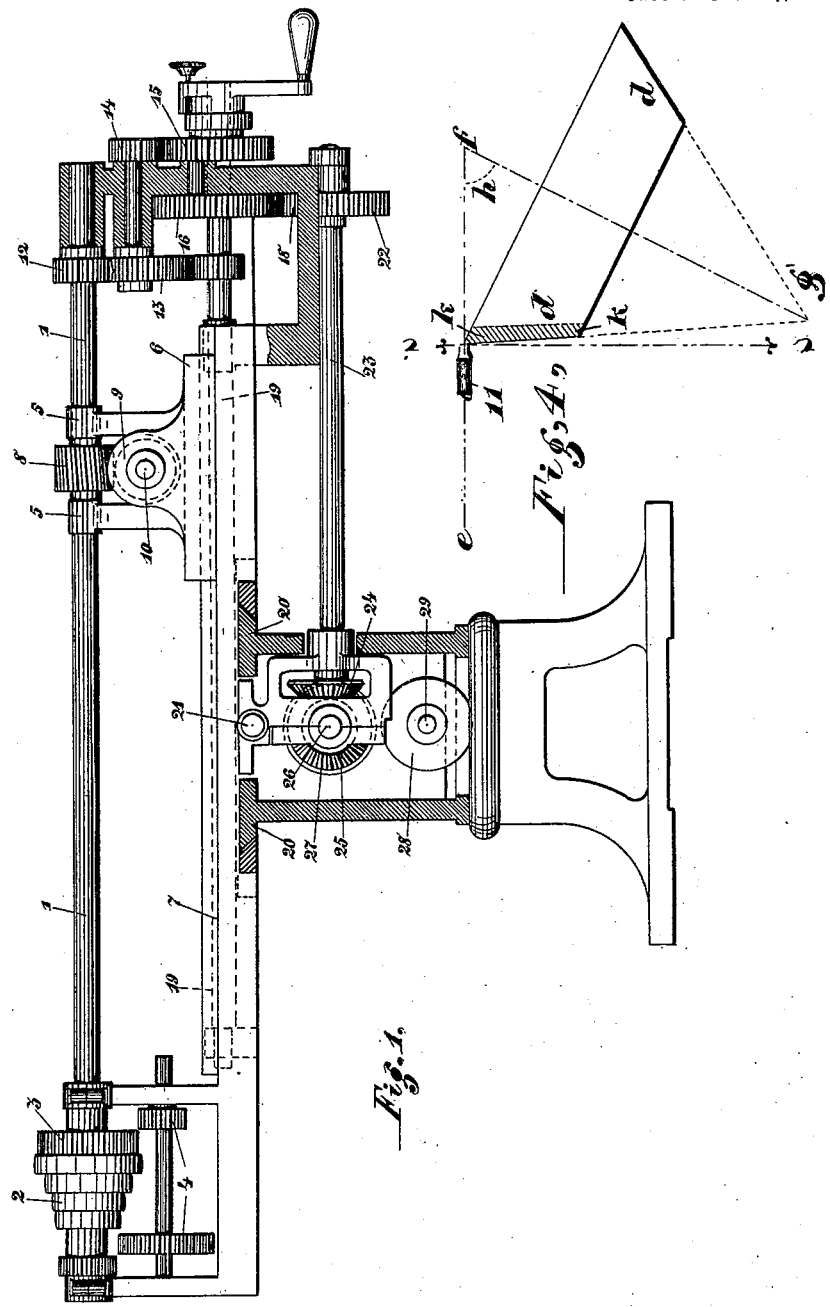
Witnesses
F. C. Barry
E. C. Duffy
Inventor
E. Polanowski
per O. E. Duffy
Attorney No. 645,427. Patented Mar. 13, 1900.
E. POLANOWSKI.
MACHINE FOR MILLING CONE SCREW WHEELS.
(Application filed Dec. 21, 1897.)
(No Model.) 2 Sheets—Sheet 2.
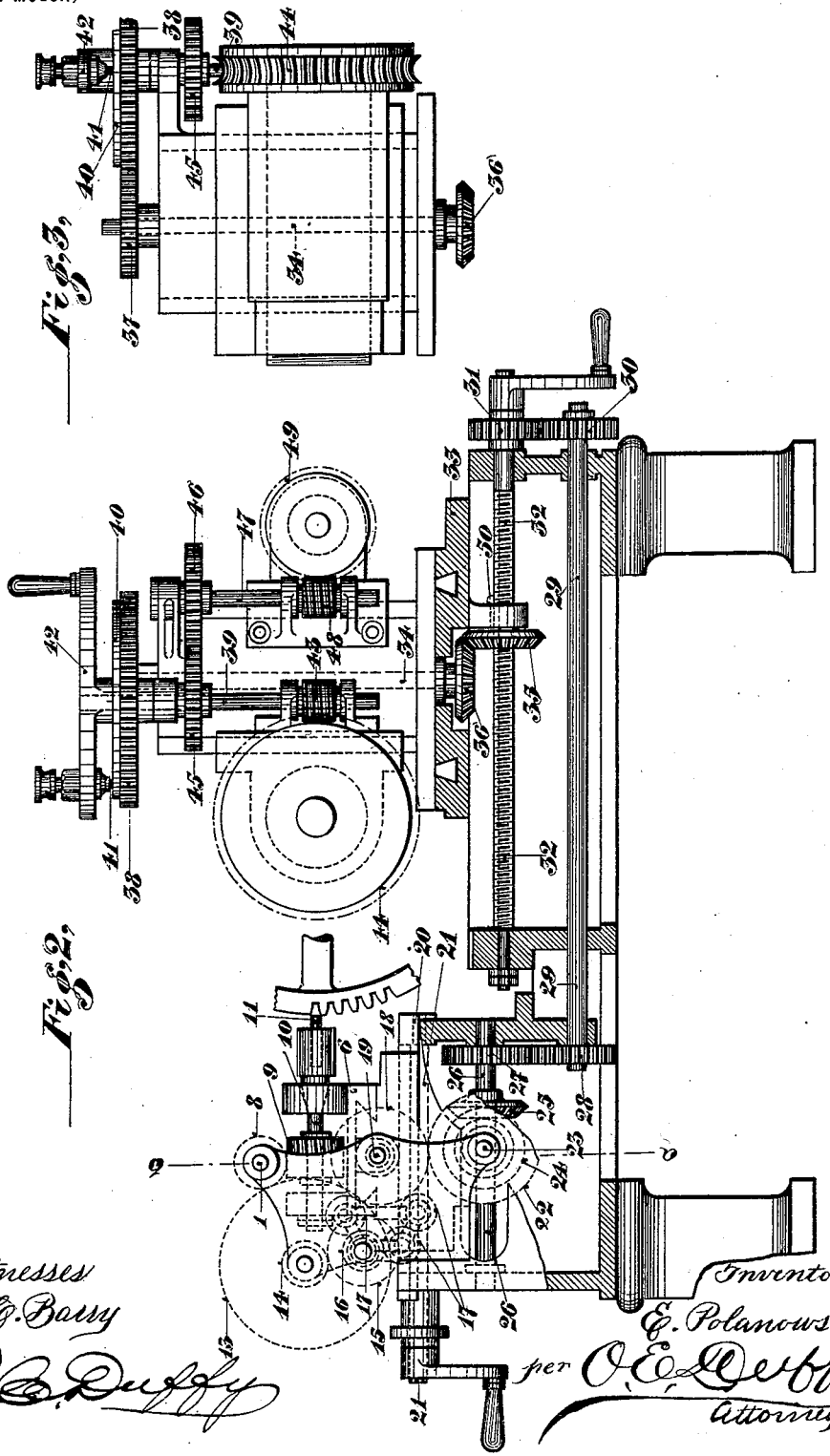
Witnesses
F. C. Barry
E. C. Duffy
Inventor
E. Polanowski
per O. E. Duffy
Attorney

UNITED STATES PATENT OFFICE.

EUZEBIUSZ POLANOWSKI, OF LODZ, RUSSIA.

MACHINE FOR MILLING CONE-SCREW WHEELS.

SPECIFICATION forming part of Letters Patent No. 645,427, dated March 13, 1900.

Application filed December 21, 1897. Serial No. 662,839. (No model.)

*To all whom it may concern:*

Be it known that I, EUZEBIUSZ POLANOWSKI, a subject of the Emperor of Russia, residing at Lodz, Russia, have invented certain new and useful Improvements in Machines for Milling Cone-Screw Wheels, (patented in Germany, No. 95,511, October 7, 1896; in Belgium, No. 124,483, November 9, 1896; in Hungary, No. 9,881, July 1, 1897; in Austria, No. 47/4,009, October 16, 1897; in England, No. 15,351, June 26, 1897; in France, No. 268,650, July 10, 1897; in Switzerland, No. 14,992, July 15, 1897, and in Canada, No. 61,209, September 19, 1898,) of which the following is a specification.

This invention relates to a machine which has for its object to mill out the periphery of conical disks in such a manner as to produce cone-wheels or bevel-wheels having helically-arranged teeth. The machine can also be employed for finishing (by milling) cast cone-screw wheels.

This machine is characterized by the fact that the cone-disk to be machined makes a slow partial rotation about its axis and is during such motion cut out along the generatrix of its cone-surface by a rotating milling cutter or tool, which moves in a straight line and the axis of rotation of which is situated, together with the axis of the cone-disk, in the same plane in which the two axes form an acute angle to each other. The result of this arrangement is that the milling-tool works correctly during the partial rotation of the cone-disk and the teeth are tapered in the requisite manner.

A form of construction of this machine is illustrated in the accompanying drawings.

Figure 1 is a vertical longitudinal section on the line *a b* of Fig. 2. Fig. 2 is a cross-section taken at right angles thereto. Fig. 3 is an elevation looking from left to right in Fig. 2 of the apparatus which receives and slowly rotates the cone-disk to be machined.
Fig. 4 is a diagram showing the angle of the axes of rotation of the tool and the cone-disk to be machined.

The part of the machine shown in Fig. 1 and on the left hand in Fig. 2 contains at the top a horizontal shaft 1, which carries on its end (on the left-hand end in Fig. 1) a loose-stepped driving-pulley 2, which is connected, either directly or by means of the gearing 4, with the spur-wheel 3, fixed on the shaft 1, according as the shaft 1 is required to rotate quicker or slower. The shaft 1 extends through the two bearing-standards 5 of a support 6, which is movable on the bed 7 in the direction of the length of the latter. Between the bearing-standards 5 there is mounted on the shaft 1 a screw-wheel 8, which shares the rotation of this shaft and also the movement of the support 6. This screw-wheel engages with a second screw-wheel 9, which is mounted at right angles to the first-mentioned wheel, also in the support 6 on the shaft 10 of the milling-cutter 11, Fig. 2, and causes this cutter to rotate. A spur-wheel 12, mounted on the other end (right-hand end in Fig. 1) on the shaft 1, drives, by means of the gears 13 14 15 16 17 18, a screw-spindle 19 and through the latter moves the support 6 along its bed 7. The three wheels 17 of the above-mentioned gear are adapted to be revolved or partially revolved about the axis of the wheel 16 and are shifted in the usual manner each time that the direction of the motion of the support 6 is to be reversed. The said three wheels 17 have equal diameters and are mounted on a frame, which can be swung about the axis of the wheel 16. Of the said three wheels 17 the uppermost one and that on the left-hand side in Fig. 2 engage permanently the wheel 16, and the lowest wheel 17 gears permanently with the wheel 17 on the left-hand side of Fig. 2. When the frame carrying the said three wheels 17 is in the position shown in Fig. 2, then the uppermost wheel 17 gears with the wheel 18 of the screw-spindle 19, rotating it in the same direction as that in which the wheel 16 rotates and moving the support 6 one way, (forward;) but when the said frame has been swung upward then the uppermost wheel 17 is disengaged from the wheel 18, whereas the lowest wheel 17 is brought into engagement with the wheel 18, which, together with the spindle 19, is then turned in the opposite direction as that of the rotation of the wheel 16, thus moving the support 6 the opposite way, (backward.)

The bed 7, Fig. 1, of the support 6 is capable of being moved transversely to the direction of its length along a second bed 20 by means of the screw-spindle 21. The spur-wheel 18 of the screw-spindle 19 rotates a spur-wheel 22, which is situated under it and whose shaft 23 carries on its other end a bevel-wheel 24, which engages with the bevel-wheel 25 on the shaft 26. The movement of this shaft is transmitted by means of the spur-wheels 27 and 28 to a shaft 29, which in its turn rotates, by means of the spur-wheels 30 and 31, a screw-spindle 32. This spindle moves another support 33 along its bed. This support receives the cone-disk to be machined. Through its center there extends a vertical shaft 34, which receives rotation from below from the spindle 32 by means of the bevel-gearing 35 36. At its upper end this shaft 34 carries a spur-wheel 37, and this wheel gears in a larger spur-wheel 38, which is mounted loose upon a shaft 39, that is parallel to the shaft 34. The wheel 38 carries on its upper face a dividing-disk 40, provided with concentric rows of holes. This dividing-disk 40 is fixed to the wheel 38 and is coupled by means of the pin 41, which is inserted in one of the holes of the corresponding row of holes, with a crank 42, which is fixed to the shaft 39. Below there is mounted on the shaft 39 a worm 43, which gears with a worm-wheel 44 to which the cone-disk to be machined is fixed. The shaft 39 drives, by means of the spur-wheels 45 46, a second shaft 47, Fig. 2, which is parallel to it and which moves, by means of a worm 48, a smaller worm-wheel 49. This latter serves to receive cone-disks of small sizes.

Each of the two worm-gears 43 44 and 48 49 is adjustable vertically and also both are capable of rotating with the whole wheel-gear upon the base-plate of the support 33, driven by the shaft 34 about the latter, the arrangement being such that the upper part of the support is guided, by means of the dovetail-shaped heads of the attachment-screws, in a suitable annular groove in the base-plate of the support. By this means the cone-disk which is to be machined and which is fixed on the respective worm-wheels 44 or 49 and of which a broken-off portion is indicated in Fig. 2 on the left of the wheel 44 can be set at the proper height and at the proper angle to the milling-cutter 11. In order to set the second support at the proper distance from the milling-cutter, the cone-wheel 35, which is mounted on the corresponding spindle 32 and is provided with an internal screw-thread, must be uncoupled from said spindle by the removal of the wedge 50. Then by rotating the spindle 32 the second support can be pushed forward or rearward by rotating the spindle 32 until the support is in the proper position. The wedge 50 is then reinserted. It should be noted that the spur-wheels 30 and 31, which drive the spindle 32 of the second support, must be changed to suit the desired pitch in each case of the screw-teeth to be cut.

The adjustment or setting of the rotating milling-cutter with reference to the work is effected in the same manner as the adjustment of an ordinary lathe-cutter.

In Fig. 4, 11 is the cutting-tool, and $d\,d$ the cone-disk. The axis of rotation $e\,f$ of the tool forms with the axis of rotation $f\,g$ of the cone-disk the acute angle $h$. The line $i\,i$ indicates the direction in which the cutting-tool is displaced. In the cone-disk it is indicated at $k\,k$ by hatching, which part is to be removed by the cutting-tool.

I claim as my invention and desire to secure by Letters Patent—

1. In a machine for milling bevel-wheels so as to produce or finish helically-arranged teeth the combination of a worm-wheel, carrying the cone-disk to be machined, a cutter rotatable about its longitudinal axis and movable in the direction of its axis and at right angles to it, means acting simultaneously upon the said cutter and the said worm-wheel in such a manner, as to rotate the said cutter, to move it at right angles to its longitudinal axis and to impart a slow partial rotation to the said worm-wheel, and means of adjusting the said cutter in the direction of its longitudinal axis, substantially as described.

2. In a machine for milling bevel-wheels so as to produce or finish helically-arranged teeth the combination of a worm-wheel, carrying the cone-disk to be machined a cutter rotatable about its longitudinal axis and movable in the direction of its axis and at right angles to it, means acting simultaneously upon the said cutter and the said worm-wheel in such a manner, as to rotate the said cutter to move it at right angles to its longitudinal axis, and to impart a slow partial rotation to the said worm-wheel, means of adjusting the said cutter in the direction of its longitudinal axis and means of adjusting the said worm-wheel with regard to the said cutter, substantially as described.

3. In a machine for milling bevel-wheels so as to produce or finish helically-arranged teeth the combination of the worm-wheel carrying the cone-disk to be machined, a cutter rotatable about its longitudinal axis and movable in the direction of its axis and at right angles to it, means acting simultaneously upon the said cutter and the said worm-wheel in such a manner as to rotate the said cutter to move it at right angles to its longitudinal axis and to impart a slow partial rotation to the said worm-wheel, means of adjusting the said cutter in the direction of its longitudinal axis and means of adjusting the said worm-wheel with regard to the said cutter, vertically, horizontally, and rotating about a vertical axis, substantially as described.

In testimony whereof I have signed my name to this specification in the presence of two subscribing witnesses.

EUZEBIUSZ POLANOWSKI. [L. S.]

Witnesses:
ADOLF JAHN,
HEINRICH MARKERT.